United States Patent [19]

Dakin

[11] 4,091,425

[45] May 23, 1978

[54] ISOLATED NON-CONSECUTIVE MISSING HALF CYCLE COMPENSATOR

[75] Inventor: Wayne Ray Dakin, Los Angeles, Calif.

[73] Assignee: MCA Technology, Inc., Universal City, Calif.

[21] Appl. No.: 299,891

[22] Filed: Oct. 24, 1972

[51] Int. Cl.² ............................................. H04N 5/76
[52] U.S. Cl. .................................. 360/38; 328/120; 358/127; 358/128
[58] Field of Search ............... 178/6.6 A, 6.6 DC; 340/174.1 B, 146.1 F; 179/100.2 K; 325/41; 328/120, 164, 162; 360/38, 51, 33; 358/8, 4, 127, 128

[56] References Cited

U.S. PATENT DOCUMENTS

| | | | |
|---|---|---|---|
| 2,996,576 | 8/1961 | Dolby | 178/6.6 DC |
| 3,213,375 | 10/1965 | St. John | 328/120 |
| 3,617,905 | 11/1971 | Castelli | 328/120 |
| 3,691,387 | 4/1972 | DeLange | 325/41 |

Primary Examiner—Raymond F. Cardillo, Jr.
Attorney, Agent, or Firm—Ronald J. Clark

[57] ABSTRACT

In the art of recording video signals, apparatus for dropout compensation by detecting "missing" positive or negative going half cycles of recorded carrier signals includes logic for generating a "new" half cycle of appropriate polarity to replace individual missing half cycles which is inserted into the original recorded signal train. If a plurality of consecutive half cycles are missing, memory circuits supply signal information that approximates the information contained in the missing half cycles.

9 Claims, 6 Drawing Figures

ISOLATED NON-CONSECUTIVE MISSING HALF CYCLE COMPENSATOR

BACKGROUND OF THE INVENTION

1. Field of the Invention

This invention relates to the recorded video art and, more specifically, to a system for detecting and compensating for the loss of signals in the video recovered from the recording medium. The absence of either positive or negative going half cycles from the carrier signal is detected. Loss of individual half cycles result in the generation of a new half cycle of the appropriate polarity and its insertion in the carrier. If several consecutive half cycles are lost, informational content of the signal is retained and is applied to the system until the carrier is restored.

2. Description of the Prior Art

In the prior art, the recording and playback of the high-frequency, FM encoded signals which transmit video information and which may be of the order of 7.0 MHz, required the creation of special magnetic recording techniques and special problems developed. Different proprietary systems have been evolved, such as increasing the linear speed of the tape relative to a stationary head or using a plurality of rotating heads that rotate at relatively high speed at substantially right angles to a tape moving linearly. These systems have been used successfully to record and play back black and white as well as color television transmissions. However, whenever less than 100 percent of the original signal is recorded or reproduced for transmission to the display, the quality of the picture suffers. This is especially so if color television is involved.

The eye is extremely sensitive to drastic changes in the visual impression made to the eye no matter how fleeting. For example, a missing half cycle in an FM recorded carrier would have the effect of drastically reducing the frequency of the modulated signal at that instant. In many video recording systems, a decrease in the frequency represents a brightening of the picture. A missing half cycle has the effect of drastically lowering the frequency and is responded to by the television display system as an immediate and sudden, discontinuous lightening of the picture, sometimes called a "blooming" effect, which produces an intense white spot in what could be an otherwise "dark" region of a picture.

Such an instantaneous change in the brightness of a portion of the television display system is very disconcerting to the viewer and may be likened to static or "pops" and "clicks" emanating from a high fidelity sound recording. The white spot on the television screen is caused by the intensity amplifier being overdriven into a saturation range. The persistence of the screen maintains the spot for a relatively long time and the effect is compounded by the persistance of the image in the eye, disproportionately exaggerating the effect.

If several consecutive half cycles of carrier are lost, either due to imperfections in the recording medium or from malfunctions in the recording or playback system, portions of the video picture may be lost and "streaks" will appear in the display. This, too, is disconcerting to the viewer and represents a problem that must be solved to provide a commercially acceptable video recording and reproducing system suitable for the consumer.

SUMMARY OF THE INVENTION

According to the invention, the recorded carrier signal is continually examined by delaying the carrier signal by approximately ½ cycle at the center frequency and continuously comparing the delayed signal against the undelayed signal. Both signals are fed through a logic network which detects the "absence" in the undelayed signal of either a positive or negative going half cycle. The logic network inserts a half cycle of proper polarity to replace any "missing" single half cycles in the carrier.

Replacing single half cycles generally is sufficient to prevent the over driving of the intensity amplifier and thereby minimizes the formation of discrete white spots on the screen. However, if more than one consecutive half cycle of the same polarity is missing, either a more complex detector employing a greater delay would be needed or additional circuits must be provided.

Accordingly, with the present detector, if the system detects the absence of more than one half cycle, a memory circuit, which is coupled to and tracks the FM discriminator output, is signalled to retain the "last" value of the information signal. This last value is then supplied to the display system until the information flow is restored, as determined by the missng cycle detector.

Retaining the latest value known to be "good" until the signal is restored assumes that information changes more or less continuously and that there is no catastrophic loss of signal and only brief interruptions which are limited perhaps to within a single line of a single field of a single frame. Retaining the same information value in these cases would have a negligible effect on the viewer.

BRIEF DESCRIPTION OF THE DRAWINGS

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

DESCRIPTION OF THE PREFERRED EMBODIMENTS

The recording of video signals either graphically, magnetically, or on themoplastic deformable materials is usually accomplished under controlled environments.

For example, the velocity of the medium with respect to the head is maintained at some predetermined magnitude in order to maintain frequency and phase relationships between the signals recorded.

Similarly, on playback, the relative velocity of the medium and the playback transducer must be carefully controlled so that the frequency and timing information which has been recorded can be recovered without substantial degradation. Unfortunately, neither the medium nor the video playback system is of the same caliber as the video transcribing equipment, or the original video input signal, and hence, there is a specific need for insuring and protecting against any loss of the carrier signal.

Figure 1:
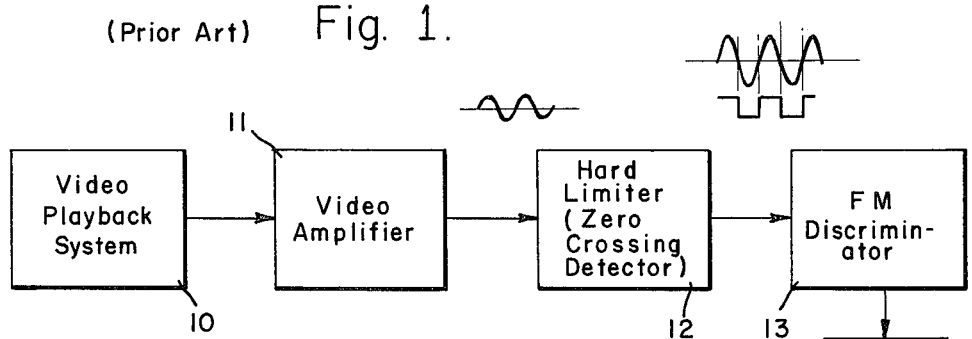
FIG. 1 is a block diagram of the conventional prior art system.

Referring now to FIG. 1, there is shown a prior art video playback system 10, which contains the necessary mechanical and electronic equipment for detecting the recorded video signal. Connected to the output of the video playback system 10 is a video amplifier 11 which amplifies the recorded video signal and feeds a hard limiter 12. The hard limiter 12 essentially performs the functions of a zero-crossing detector. The substantially square wave output of the hard limiter 12 will have a repetition frequency dependent upon the informational content of the video signal being recorded, generally varying between 5.6 MHz and 8.4 MHz. The output of the hard limiter 12 is fed to a FM discriminator which extracts the video information from the carrier. The video information signal is applied to a video display system 14 which is the utilization device observed by the viewer.

The composite video signal, by definition, is adapted to produce a lighter scene as the carrier frequency decreases. It can be appreciated, therefore, by reviewing the waveforms associated with the output of the hard limiter 12 that, should a half cycle of the carrier be missing for any reason, the instantaneous value of the frequency will decrease substantially since the frequency of the output signal is the reciprocal function of the period.

The absence of either a positive or a negative going half cycle will have the effect of substantially increasing the period and reducing the apparent or instantaneous frequency. A bright, white spot or blooming of the picture will result in the video display system 14.

The missing half cycle could be the result of defects in the recording medium, defective video playback system 10, defective video amplifier 11, or, for any other reason, a missed zero crossing detector output from the hard limiter 12. The objectionable blooming effect as displayed by the video display system 14 will be the same.

Figure 2:
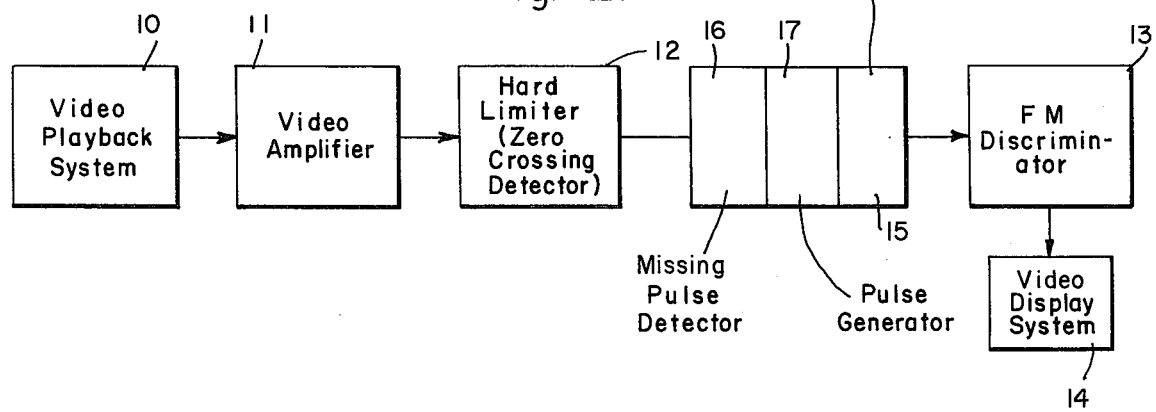
FIG. 2 is a block diagram of the over-all system incorporating the present invention.

Referring now to FIG. 2, there is shown a block diagram which ideally illustrates the principle of the present invention and which is arranged to detect the absence of a positive or negative going half cycle. A "new" half cycle of the proper polarity is generated and is then "inserted" into the carrier signal feeding the FM discriminator 13. The video playback system 10 feeding the video amplifier 11 and the hard limiter 12 are similar in function to that described in connection with FIG. 1.

However, the output of the hard limiter 12 is fed through an appropriate delay (not shown) to a combining network 15 and to a half cycle detector 16. The half cycle detector 16 detects the absence of either a negative or a positive going half cycle from the hard limiter 12, and in response thereto, drives a half cycle generator 17, which generates a half cycle of the proper polarity. The half cycle is then fed into the combining network 15 in the proper timed relationship with the signal from the hard limiter 12. The combining network 15 combines the outputs from the hard limiter 12 with the outputs from the half cycle generator 17 and feeds the FM discriminator 13.

The embodiment of FIG. 2 presupposes only occasional losses of single half cycles during an extended playback transmission. An alternative approach to the problem could utilize a memory circuit in place of the half cycle generator 17 which would continuously monitor the signal content of the transmission and would be operable in response to signals from the half cycle detector 16 signifying a missing half cycle to continue to provide to the display system the last "good" value of the information until an information flow is restored, which would also be signalled by the half cycle detector 15.

Figure 3:
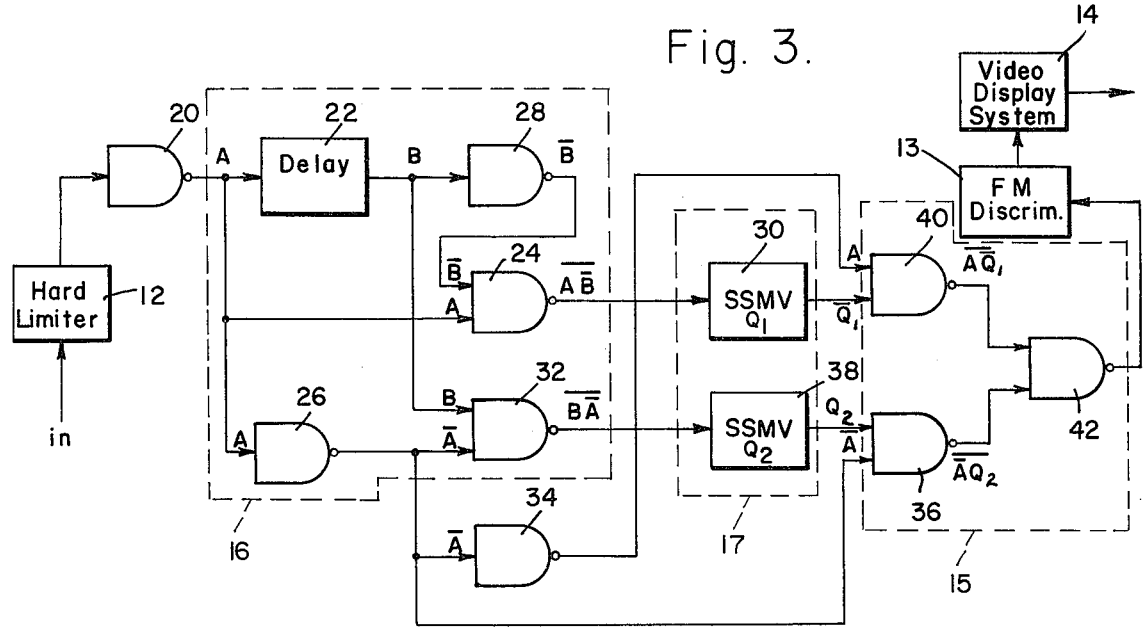
FIG. 3 is a logical diagram illustrating how a "missing" negative or positive going half cycle is detected and a "new" half cycle of the proper polarity is inserted.

Referring now to FIG. 3, there is shown a logic circuit which is a preferred mechanization of the block diagram of FIG. 2, and which will detect and replace occasional missing half cycles. The operation of the logic diagram of FIG. 3 will best be understood by referring also to the squared waveforms illustrated in FIG. 4, which are correlated to selected output points of the logic diagram, and will more fully illustrate how a "missing" positive or negative going half cycle is detected and how a new half cycle of the proper sense is generated and inserted into the carrier signal train which feeds the FM discriminator 13, as illustrated in FIG. 2.

In FIG. 3, there is shown the hard limiter 12 which is connected to gate 20 which inverts the output from the hard limiter 12. It is assumed that the input signal to the gate 20 at different times will lack a positive going half cycle and a negative going half cycle and that the output of gate 20 is represented by the squared off waveform A in FIG. 4.

A review of waveform A shows a series of half cycles from $t_1$ through $t_{13}$. At the interval $t_5$-$t_6$ a positive half cycle is assumed to be "missing" followed by "normal" half cycles from $t_7$ through $t_9$. The positive going half cycle at $t_9$ should be followed by a negative going half cycle at $t_{10}$, which, in this example, is "missing". The negative going half cycle at $t_{12}$ is "normal". By way of review therefore, waveform A has a missing positive half cycle at the intervals $t_5$-$t_6$ and a missing negative half cycle at the intervals $t_{10}$-$t_{11}$.

The output of inverting gate 20 is directed to the input of a delay line 22, a gate 24 and a gate 26, which each receive the signal A as one of their inputs. Since the carrier frequency involved can range between 5.6 MHz to 8.4 MHz, in this embodiment the delay to be caused by the delay line 22 is selected to be ½ cycle at the center frequency of 7.0 MHz, and is therefore approximately ½ cycle over the frequency band of interest.

It will be understood that the choice of ½ cycle where the delay 22 is intended to detect and signal missing half cycles with a minimum of delay. Obviously, the delay could be selected to equal any odd number of half cycles and would function to detect the loss of an occasional half cycle.

Figure 4:
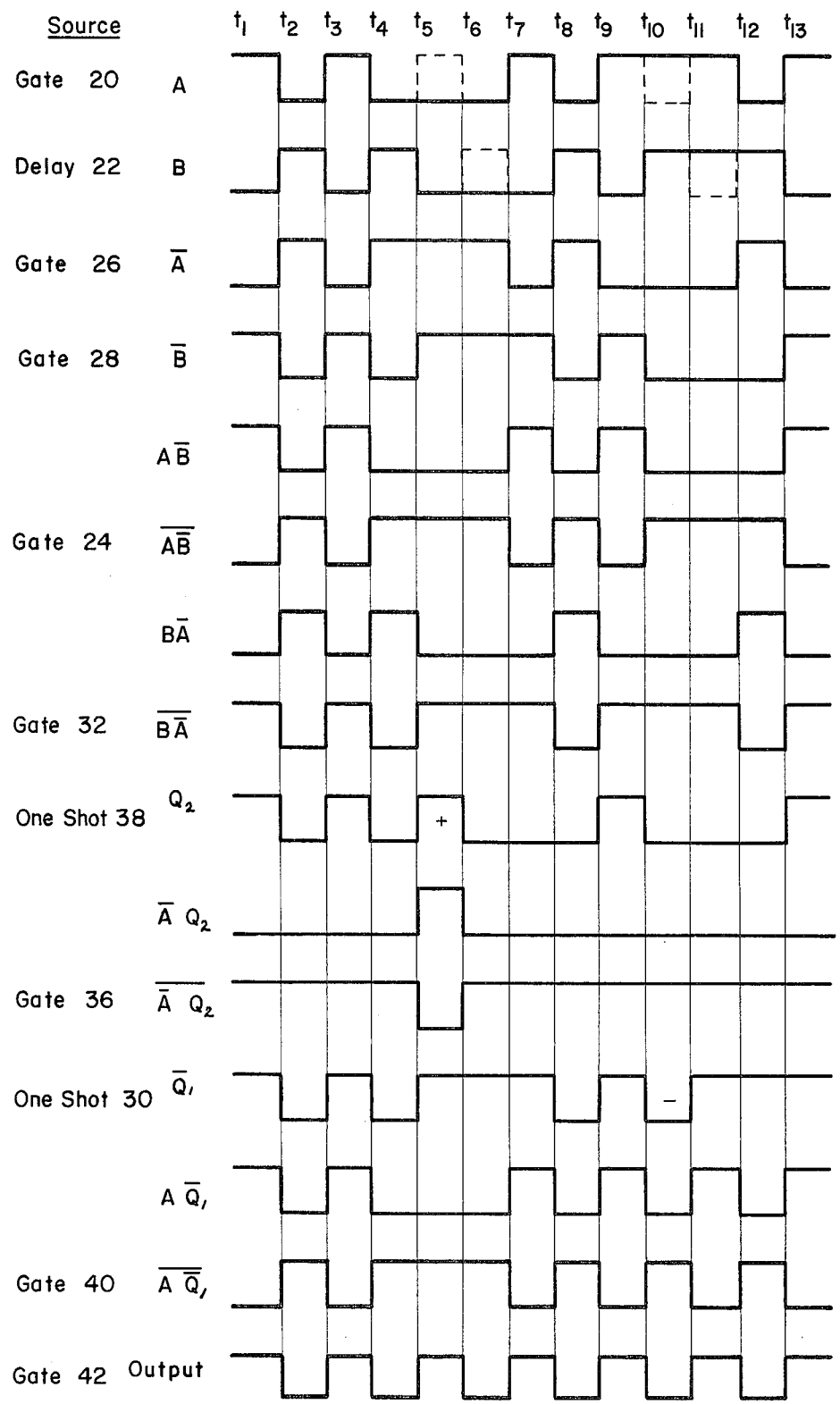
FIG. 4 is a timing diagram illustrating the waveforms at the various points of the circuit described in connection with FIG. 3.

The output of the delay line 22 is illustrated as curve B in FIG. 4 which is a signal train that is delayed a ½ cycle from that of curve A. The output of the delay line 22, Curve B, is fed to a gate 28 that inverts the input signal to generate Curve B̄ to the input of gate 24.

"NAND" gates have been employed in a mechanization of the preferred embodiment. The output signal of gate 24, $\overline{AB}$ illustrates a positive going transition of a signal at times $t_2$, $t_4$, $t_8$ and $t_{10}$. To retain logical consistency throughout, and to retain the convention that a positive signal represents a "1" or true signal while a negative signal represents a "0", or false signal, the negative going signal output of one shot 30 will be identified as $\overline{Q}_1$.

Gate 26, which simply inverted the waveform A, generates waveform $\overline{A}$, which is applied to the inputs of gates 32, 34, and 36. The output of the delay line 22 is also applied to the input of gate 32. Gate 32, therefore, receives B and $\overline{A}$ to produce an output curve of $\overline{B\overline{A}}$. $B\overline{A}$ is fed as the input signal to $Q_2$ monostable multivibrator or one-shot 38 which is adapted to generate a positive going half cycle whenever the input signal is positive going. Retaining the conventions heretofore set out, the signal output of the one shot 38 is identified as $Q_2$. Whenever the input signal of $B\overline{A}$ is going positive, as at $t_1$, $t_3$, $t_5$, $t_9$ and $t_{13}$, one shot 38 generates a positive signal, such as at times $t_3$, $t_5$, $t_9$ and $t_{13}$.

The positive half cycles generated by the one shot 38, as shown in curve $Q_2$ are fed as a second input of gate 36. The output of gate 36 is $\overline{\overline{A}\ Q_2}$ which in this example, is a single, negative going pulse between times $t_5$ and $t_6$.

The output of the one shot 30, $\overline{Q}_1$ is applied to one input of gate 40. Curve A, is fed to the other input gate 40. The output of gate 40, $\overline{A\ \overline{Q}_1}$ and represents, as shown in FIG. 4, a half cycle to replace the "missing" negative half cycle between times $t_{10}$ and $t_{11}$.

$\overline{A\ \overline{Q}_1}$ and $\overline{\overline{A}\ \overline{Q}_2}$ are both fed to the inputs of gate 42, which generates the reconstituted composite curve illustrated in FIG. 4 as output 42, which is then fed to the FM discriminator 13. Because of the extensive use of logical circuits, it will be appreciated that the actual mechanization of the invention need not follow the diagram of FIG. 2, but rather any logically equivalent circuit can generate the composite signal in the correcting circuit of FIG. 3.

By way of review, it can be appreciated therefore, that the incoming carrier signal is continuously being compared to a delayed version of itself, to determine the absence of either a positive or a negative going half cycle in the incoming signal train. In the event there are no signal discontinuities then the output of gate 40 will be equivalent to the signal $\overline{A}$, which merely represents a phase reversal of A as shown in FIG. 4. The output of the final NAND gate 42 will then be equivalent to A.

It can be appreciated therefore, that the logical circuit illustrated in FIG. 3, causes the $Q_2$ one shot 38 to generate a positive going half cycle in the event of a "missing" positive half cycle and the $Q_1$ one shot 30 to generate a signal which ultimately provides a negative going half cycle in the event of a "missing" negative half cycle in the original signal train.

The "missing" half cycles are inserted when the comparison of A with B indicates that such insertion is necessary. Since the $Q_1$ one shot 30 and the $Q_2$ one shot 38 are generating signal trains which generally correspond to the original signal, it can be appreciated that a substantially fast acting monostable multivibrator is preferred.

Obviously the output generated by either of the two single shot multivibrators 30 and 38 will, in all probability neither be precisely identical in width to the original missing half cycles, nor will they contain or convey the same frequency modulation. However, no great signal discontinuities will be caused by the occasional synthesis of a "missing" half cycle.

Other circuits which are logically equivalent to the embodiment of the FIG. 3 will be able to substantially reduce the whitening or blooming effect of missing half cycles by preventing the frequency from being effectively halved. Other mechanisations according to the teaching of FIG. 2 will also reduce the deleterious effects of "missing" half cycles and persons skilled in the art will be able to devise yet other, alternative embodiments without departing from the teachings of the invention.

Thus far, there has been shown apparatus for countering the catastrophic effect of a missing pulse in the carrier signal on the display. The illustrated correcting circuits of the present invention "restore" missing carrier half cycles, but add no "information" to replace the information that is lost.

Further, the mechanization of FIG. 3 is unable to cope with the loss of signal for more than a half cycle.

An analysis of FIG. 4 would indicate that the loss of two consecutive positive or negative going half cycles would not result in the replacement of both of them but rather only the first. Therefore, in the absence of a mechanization of FIG. 2 that could recognize the loss of any number of half cycles, it is desirable to have additional circuitry that can be called upon to prevent discontinuity in the display, should a plurality of half cycles be lost.

Figure 5:
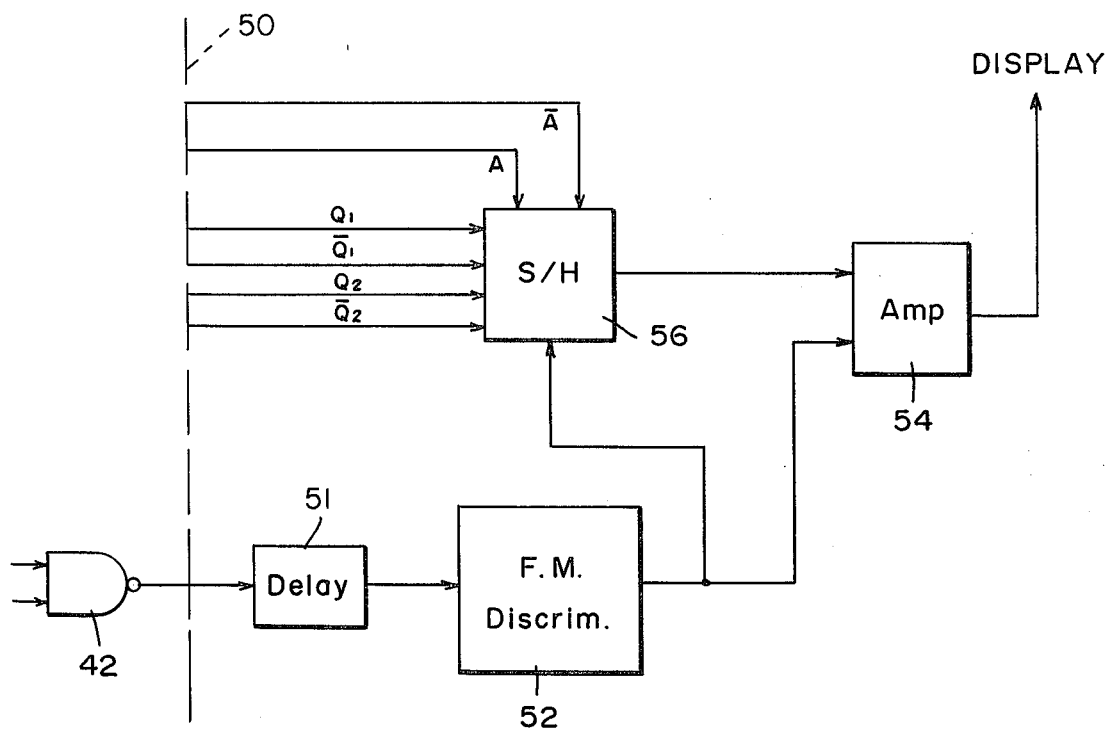
FIG. 5 is a logical diagram of a memory network to retain information.
Figure 6:
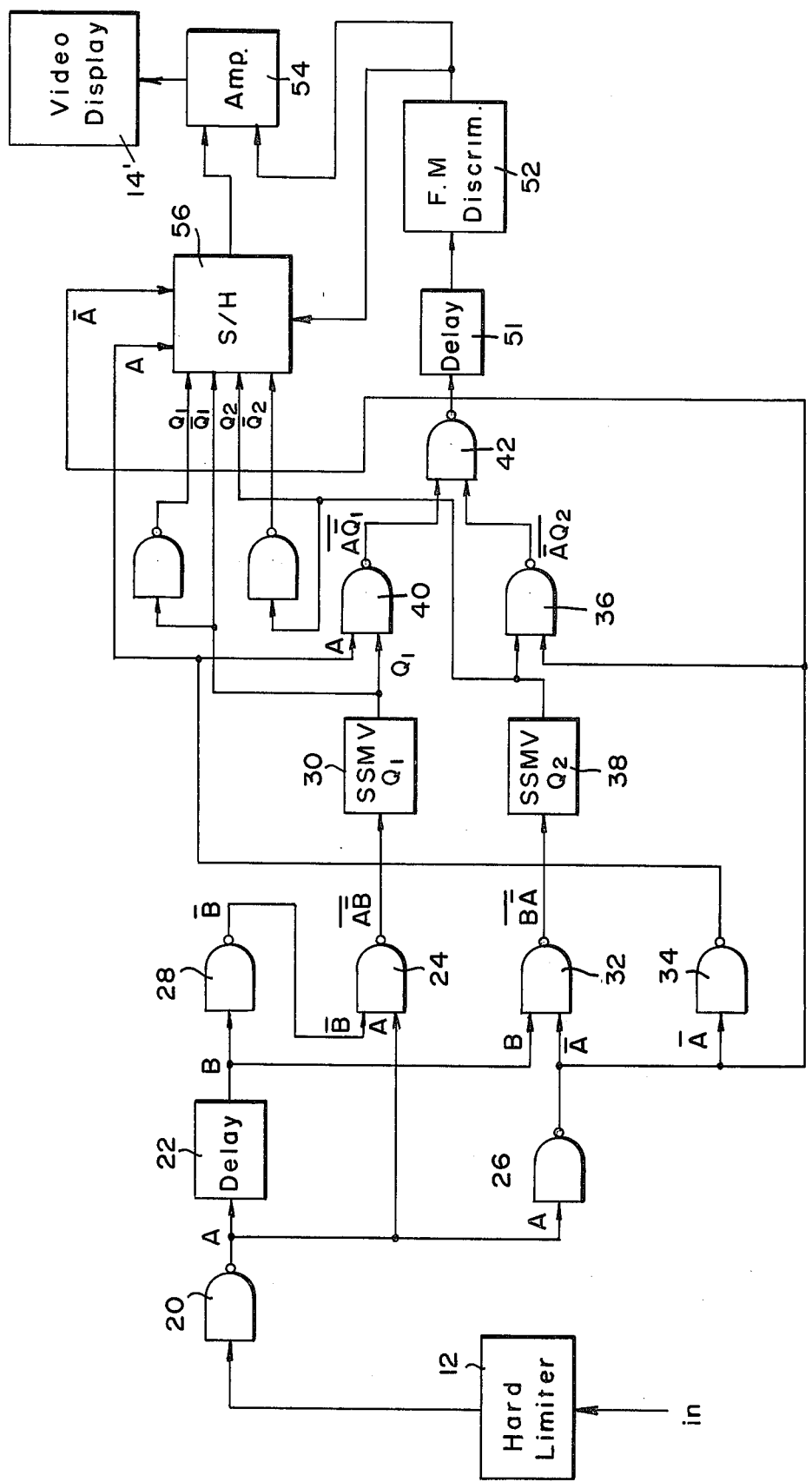
FIG. 6 is a diagram of the combination of FIG. 3 with FIG. 5 to provide a complete system.

Turning next to FIGS. 5 and 6, there are shown in block form, arrangements which can help to prevent the effects of such discontinuities in the flow of information. The correcting circuits of FIG. 3, have been repeated in FIG. 6, in detail and, continuously supply an output signal from gate 42 which is applied through a delay 51, to an FM discriminator circuit 52, which is substantially identical to the FM discriminator 13 of FIG. 2. The FM discriminator 52 extracts the information that has been modulated upon the carrier and this information output signal is applied both to an output amplifier 54 and to a Sample and Hold network 56.

The Sample and Hold network 56 also receives signal inputs from the correcting circuits 50, including signals representing A, $\overline{A}$, $Q_1$, $\overline{Q}_1$, $Q_2$ and $\overline{Q}_2$ since it can be determined when half cycles are missing from the states of these signals. The Sample and Hold network 56 also receives, on a continuous basis, the information output signal of the FM discriminator 52.

As shown in FIG. 6, whenever the correcting circuits 50 are called upon to supply more than one missing half cycle the most recent value of the information output signal from the FM discriminator 52 is retained in the Sample and Hold circuit 56. The Sample and Hold output is then applied to the amplifier 54 in the succeeding time intervals.

When the carrier signal is restored, the correcting circuits 50 again transmit the complete carrier. The FM discriminator 52 information output signal is then credible and "updates" the sampling circuits of the Sample and Hold network 56 which then merely "track" the output signal. Since the amplifier 54 receives both the output of the FM discriminator 52 and the Sample and Hold network 54, generally the inputs will be identical. Whenever there is a "loss" of FM information, the Sample and Hold network 54 will continue to apply an information signal which will be an adequate approximation for a portion of a line of the picture.

Clearly, a multiplicity of circuits are known and available to perform the Sample and Hold function under the control of the correcting circuits 50. It is sufficient that the circumstances of their use be specified as hereinabove.

It is also within the scope of the present invention to merely detect the absence of a half cycle and, rather than generating a replacement half cycle, merely utilize a Sample and Hold network to avoid information loss.

Thus, there has been shown apparatus for eliminating the objectionable white spots or "blooms" on the playback of a recorded video signal. Occasional non-consecutive "missing" half cycles are detected and half cycles of proper polarity are generated and inserted into the transmission. This prevents wide discontinuous excursions of the information signal from the FM discriminator which would occur if a half cycle of the carrier signal were lost.

If more than one consecutive half cycle were to be lost, sample and hold circuits, which continuously monitor and track the discriminator output, apply to the display device, the value of the last information signal prior to the detection of the missing pulses. The stored value is then retained and applied to the display system until the flow of information from the discriminator is restored.

Accordingly, the scope of the invention should be limited only by the claims appended hereto.

What is claimed as new is:

1. In combination with means for generating a frequency modulated signal train representative of desired information, apparatus for detecting and replacing occasional missing half cycles of the train comprising:
    (a) detecting means responsive to the absence of a half cycle in the signal train;
    (b) pulse generating means responsive to said detecting means for generating a substitute half cycle pulse corresponding to an isolated non-consecutive missing half cycle in the signal train; and
    (c) combining means coupled to said pulse generating means and the means for generating a signal train for combining said substitute half cycle pulse with the signal train in the proper timed relationship to produce a continuous sequential output signal train in which substitute half cycle pulses maintain the frequency of said output signal train within predetermined limits.

2. A combination according to claim 1 wherein said detecting means include means for delaying the signal train for substantially $n/2$ cycles, where "$n$" is an odd integer to produce a delayed signal train and
    means for comparing said delayed signal train with the undelayed signal train to determine that a half cycle is missing from the signal train.

3. The combination of claim 1 wherein said pulse generating means include first means responsive to a missing positive going half cycle in the signal train for generating a substitute half cycle pulse corresponding thereto; and
    second means responsive to a missing negative going half cycle in the signal train for generating a substitute half cycle corresponding thereto and wherein said combining means combine said substitute half cycle pulses with a signal train derived from the signal train in the proper timed relationship, thereby producing a continuous sequential signal train in which substitute half cycle pulses maintain the frequency of the signal train within predetermined limits.

4. A combination according to claim 3 wherein said first means include a first one-shot circuit for generating half cycle pulses, and
    said second means include a second one-shot circuit for generating half cycle pulses.

5. In a video display system, the method of compensating for occasional interruptions of the video carrier signal otherwise resulting in a white spot comprising the steps of:
    (1) splitting the carrier signal into at least two signal trains;
    (2) delaying one of said signal trains relative to the other by at least ½ cycle at the center frequency;
    (3) comparing the delayed and undelayed signal trains to determine the absence of a transition between predetermined positive and negative signal limits, corresponding to a missing non-consecutive positive or negative half cycle;
    (4) generating substitute half cycle pulses of appropriate polarity and duration to correspond to missing half cycles; and
    (5) combining said substitute half cycle pulses with said signal train at the appropriate time to produce a composite signal train having substitute half cycles of proper polarity and duration in place of missing non-consecutive half cycles.

6. Apparatus for compensating for carrier signal dropouts in playing back a recorded video transmission, comprising in combination:
    a. input means for receiving a raw playback signal;
    b. dropout detecting means coupled to said input means including delaying-comparing means for comparing a first signal corresponding to the raw playback signal with a second signal corresponding to the raw playback signal delayed by a predetermined amount, to determine the absence of isolated, non-consecutive half cycles in the raw signal; and
    c. generation and insertion means coupled to said dropout detecting means for creating a half cycle signal of appropriate polarity and for combining said created half cycle signal with said first signal in replacement of a detected absent half cycle signal,
    whereby said combination provides a derived processed playback carrier signal free from signal dropouts.

7. In combination,
    first means for generating a signal train having a frequency modulation representative of desired information;
    second means for detecting isolated missing positive going half cycles in said signal train;
    third means responsive to said second means for generating a substitute half cycle pulse, corresponding to each missing positive going half cycle;
    fourth means for detecting isolated missing negative going half cycles in said signal train;
    fifth means responsive to said fourth means for generating a substitute half cycle pulse corresponding to each missing negative going half cycle; and
    sixth means coupled to said first, third and fifth means, producing a continuous, sequential signal train at a frequency within a predetermined range of frequencies from the signal train and said substitute half cycle pulses.

8. In combination:

first means for generating an original signal train having a frequency modulation representative of desired information from an applied carrier signal;

means for delaying said signal train substantially $n/2$ cycles, where "$n$" is an odd integer;

logic means coupled to said first means and said delaying means for logically combining said delayed signal train and its complement with said original signal train and its complement to provide a first output corresponding to positive half cycles and a second output corresponding to negative half cycles;

a first one-shot circuit responsive to said first output of said logic means for generating half cycle pulses;

a second one-shot circuit responsive to said second output of said logic means for generating half cycle pulses; and means for logically combining the outputs of said first and second one-shot circuits with the original signal train and its complement for generating a continuous sequential signal train at a frequency within a predetermined range of frequencies.

9. A system for preventing the blooming of a video display resulting from the absence of isolated positive or negative half cycles in a carrier signal, the combination comprising:

first means for generating a frequency modulated signal train from an applied carrier signal;

detecting means coupled to said first means for responding to the absence of occasional isolated half cycles in the carrier signal;

second means coupled to said detecting means and responsive to isolated, non-consecutive missing positive going half cycles in said signal train for generating a half cycle pulse, corresponding thereto;

and responsive to isolated non-consecutive missing negative going half cycles in said signal train for generating a half cycle pulse, corresponding thereto; and third means for combining the pulse output of said second means in the proper timed relationship with the first means output for producing a continuous sequential signal train at a frequency within a predetermined carrier frequency range.

* * * * *